US012772290B2

(12) United States Patent
Zhao et al.

(10) Patent No.: US 12,772,290 B2
(45) Date of Patent: Oct. 20, 2026

(54) METHOD AND APPARATUS FOR SHARING CHANNEL OCCUPANCY TIME

(71) Applicant: BEIJING XIAOMI MOBILE SOFTWARE CO., LTD., Beijing (CN)

(72) Inventors: Wensu Zhao, Beijing (CN); Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 282 days.

(21) Appl. No.: 18/693,933

(22) PCT Filed: Sep. 23, 2021

(86) PCT No.: PCT/CN2021/120002
§ 371 (c)(1),
(2) Date: Mar. 20, 2024

(87) PCT Pub. No.: WO2023/044681
PCT Pub. Date: Mar. 30, 2023

(65) Prior Publication Data

US 2024/0389148 A1 Nov. 21, 2024

(51) Int. Cl.

| | |
|---|---|
| ***H04W 74/0816*** | (2024.01) |
| ***H04W 72/0446*** | (2023.01) |
| ***H04W 72/25*** | (2023.01) |
| ***H04W 72/40*** | (2023.01) |
| ***H04W 74/08*** | (2009.01) |
| *H04W 92/18* | (2009.01) |

(52) U.S. Cl.
CPC ... *H04W 74/0816* (2013.01); *H04W 72/0446* (2013.01); *H04W 72/25* (2023.01); *H04W 72/40* (2023.01); *H04W 74/0866* (2013.01); *H04W 92/18* (2013.01)

(58) Field of Classification Search
CPC ............. H04W 72/25; H04W 74/0816; H04W 74/0808; H04W 74/002; H04W 92/18; H04W 76/14; H04W 16/14; H04W 72/20; H04L 27/2602; H04L 27/2607; H04L 5/0044; H04L 5/0048; H04L 5/0053; H04L 5/0055; H04L 5/0091
See application file for complete search history.

(56) References Cited

U.S. PATENT DOCUMENTS

2020/0280971 A1* 9/2020 Moon .................. H04L 5/0053
2021/0092783 A1* 3/2021 Sun ...................... H04L 5/0055
2022/0078845 A1* 3/2022 Xu ....................... H04L 5/0007
(Continued)

FOREIGN PATENT DOCUMENTS

CN 111565475 A 8/2020

OTHER PUBLICATIONS

PCT/CN2021/120002 International Search Report dated Jun. 8, 2022, 2 pages.

*Primary Examiner* — Romani Ohri
(74) *Attorney, Agent, or Firm* — Cozen O'Connor

(57) ABSTRACT

A method for sharing a channel occupancy time (COT) is applied to a sidelink unlicensed frequency band of terminal devices and is performed by a first terminal device. The method includes: sending first shared COT information to a second terminal device; in which the first terminal device is a terminal device for initiating the COT, and the second terminal device is a terminal device with which the COT is shared.

14 Claims, 6 Drawing Sheets

(56) References Cited

U.S. PATENT DOCUMENTS

| | | | | |
|---|---|---|---|---|
| 2022/0287093 | A1* | 9/2022 | Iyer | H04W 74/0808 |
| 2023/0262756 | A1* | 8/2023 | Stefanatos | H04W 72/04 370/329 |
| 2023/0354275 | A1* | 11/2023 | Moon | H04W 72/0446 |
| 2023/0354425 | A1* | 11/2023 | Jeon | H04L 5/0048 |
| 2023/0362988 | A1* | 11/2023 | Liu | H04W 72/20 |
| 2023/0413325 | A1* | 12/2023 | Li | H04W 72/0446 |

* cited by examiner

METHOD AND APPARATUS FOR SHARING CHANNEL OCCUPANCY TIME

CROSS-REFERENCE TO RELATED APPLICATION

This application is a US national phase application of International Application No. PCT/CN2021/120002, filed on Sep. 23, 2021, the content of which is hereby incorporated by reference in its entirety for all purposes.

TECHNICAL FIELD

The disclosure relates to the field of communication technologies, and in particular, to a method and device for sharing a channel occupancy time (COT).

BACKGROUND

With the continuous emergence of new communication services and application requirements for mobile communication networks, higher and higher performance requirements are being placed on sidelink (SL) transmission between terminal devices, such as transmission bandwidth, communication rate, communication delay, reliability, or scalability.

SUMMARY

In a first aspect, embodiments of the disclosure provide a method for sharing a COT, applied to a sidelink unlicensed frequency band. The method is performed by a first terminal device. The method includes: sending first shared COT information to a second terminal device.

In a second aspect, embodiments of the disclosure provide a method for sharing a channel occupancy time (COT), applied to a sidelink unlicensed frequency band. The method is performed by a second terminal device. The method includes: receiving first shared COT information; determine second shared COT information; and send the second shared COT information to a third terminal device.

In a third aspect, embodiments of the disclosure provide a terminal device, including a processor and a memory, in which the memory has a computer program stored thereon, and the processor is configured to send first shared COT information to a second terminal device.

BRIEF DESCRIPTION OF THE DRAWINGS

In order to clearly illustrate technical solutions according to embodiments of the disclosure, drawings that need to be used in embodiments of the disclosure will be described below.

DETAILED DESCRIPTION

Figure 1:
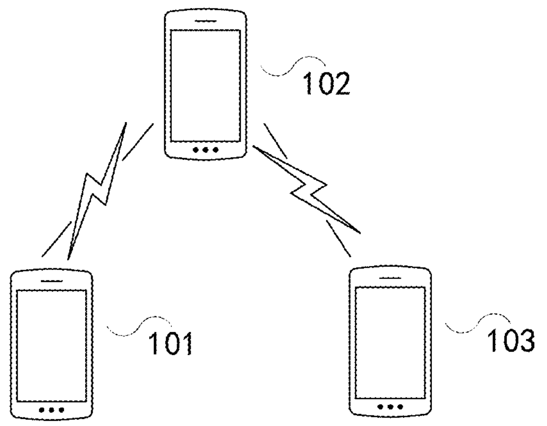
FIG. 1 is a schematic structural diagram illustrating a communication system according to embodiments of the disclosure.

Embodiments of the disclosure will be described in detail below, examples of which are illustrated in drawings, in which the same or similar reference numerals denote the same or similar elements or elements having the same or similar functions throughout. Embodiments described below by referring to the drawings are examples, are intended to explain the disclosure and should not be construed as limiting the disclosure. Among them, in the description of the disclosure, unless otherwise specified, the character "/" means "or". For example, the term "A/B" may mean "A or B", and the term "and/or" is only used for describing an association between objects, which means three relationships. For example, the term "A and/or B" means only A, only B, and both A and B.

With the continuous emergence of new communication services and application requirements, sidelink (SL) between terminal devices has higher and higher performance requirements for transmission bandwidth, communication rate, communication delay, reliability, or scalability. However, limited licensed spectrum alone cannot meet diverse application scenarios and needs in the future. Therefore, research on sidelink communication technology for the terminal device on an unlicensed spectrum is very urgent.

In order to better understand methods for sharing a channel occupancy time (COT) according to embodiments of the disclosure, the communication system to which embodiments of the disclosure are applicable is firstly described below.

As illustrated in FIG. 1, FIG. 1 is a schematic structural diagram illustrating a communication system according to embodiments of the disclosure. The communication system may include, but not limited to, three terminal devices, where the terminal devices may communicate with each other through a Sidelink (SL). The number of terminal devices and the form of each terminal device illustrated in FIG. 1 are for example only and do not limit embodiments of the disclosure. The communication system illustrated in FIG. 1 includes a first terminal device 101, a second terminal device 102 and a third terminal device 103 as an example.

The first terminal device 101, the second terminal device 102, and the third terminal device 103 in embodiments of the disclosure may respectively be an entity for receiving or transmitting a signal, such as a mobile phone. The terminal device may also be called terminal, user equipment (UE), mobile station (MS), mobile terminal (MT) and so on. The terminal device may be a vehicle having a communication function, a smart vehicle, a mobile phone, a wearable device, a tablet computer (Pad), a computer having a wireless transceiver function, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a terminal device in smart city, a wireless terminal device in smart home, etc. Embodiments of the disclosure do not limit the specific technology and specific device form of the terminal device.

It is understandable that the communication system described in embodiments of the disclosure is to illustrate the technical solutions of embodiments of the disclosure more clearly, and does not constitute a limitation on the technical solutions according to embodiments of the disclosure. With the evolution of the system architecture and the emergence of new service scenarios, the technical solutions according to embodiments of the disclosure may also be applicable to similar technical problems.

Methods and devices for sharing a channel occupancy time (COT) according to the disclosure will be described in detail below with reference to accompanying drawings.

Figure 2:
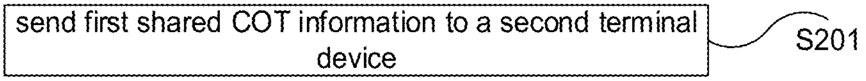
FIG. 2 is a flowchart illustrating a method for sharing a channel occupancy time (COT) according to embodiments of the disclosure.

As illustrated in FIG. 2, FIG. 2 is a flowchart illustrating a method for sharing a COT according to embodiments of the disclosure. It is noteworthy that the method for sharing a COT according to embodiments of the disclosure may be performed by a first terminal device. The first terminal device is a terminal device for initiating the COT. As illustrated in FIG. 2, the method for sharing the COT may include, but not limited to, the following.

At block S201, first shared COT information is sent to a second terminal device.

In embodiments of the disclosure, the second terminal device may be a terminal device with which the COT is shared.

In an implementation, the first shared COT information includes at least one of: a first remained length of the COT; a COT identifier (ID); or a channel access type.

For example, the first terminal device may use Type 1 Listen Before Talk (LBT) to access a channel, initiate a COT having a certain length, determine the first remained length of the COT based on a specific situation, and carry the shared COT information including at least one of the first remained length of the COT; the ID of the COT; or the channel access type when performing a sidelink communication with the second terminal device.

In embodiments of the disclosure, the first remained length of the COT may be understood as a length of the COT available to the second terminal device, which may be determined by the first terminal device based on different situations.

In some embodiments of the disclosure, the first remained length of the COT may be represented by a value of bits.

For example, assuming that the first remained length of the COT is 3 slots, "0011" may be used for representing the first remained length of the COT.

In embodiments of the disclosure, a COT ID is an ID identifying the COT that is shared, and is used for distinguishing different COTs shared between the terminal devices. In the shared information generated by all terminal devices that share the same COT, the COT IDs are all the same.

In embodiments of the disclosure, the channel access type is used for indicating a type of accessing a channel used by the second terminal device that receives the first shared COT information. For example, the channel access type may be Type 2A, Type 2B, Type 2C, or others.

By implementing embodiments of the disclosure, the second terminal device may share the COT with the first terminal device by sending the first shared COT information to the second terminal device, such that the terminal device may obtain a longer communication time, thereby improving a utilization rate of frequency bands and meeting communication service requirements.

Figure 3:
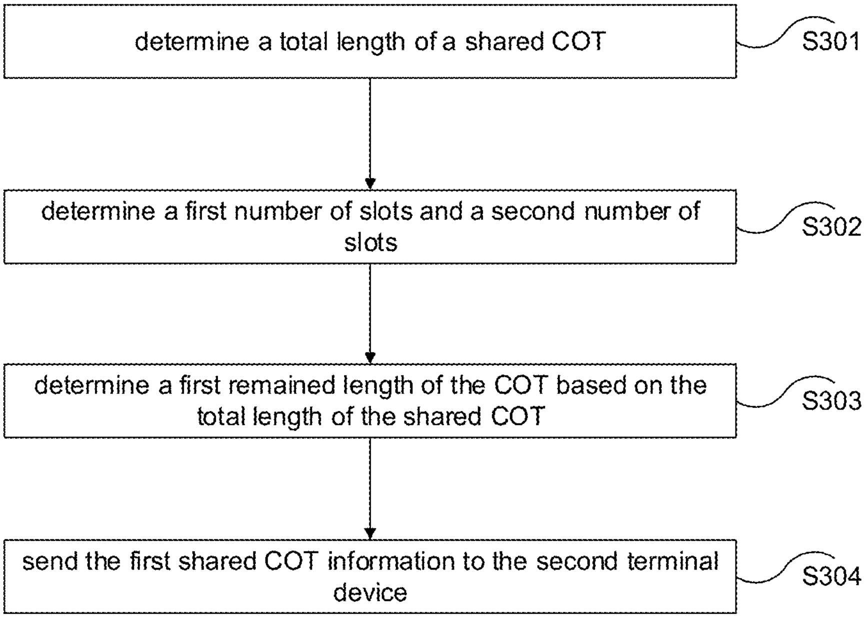
FIG. 3 is a flowchart illustrating another method for sharing a COT according to embodiments of the disclosure.

As illustrated in FIG. 3, FIG. 3 is a flowchart illustrating another method for sharing a COT according to embodiments of the disclosure. Based on this method, the first remained length of the COT may be determined based on a total length of a shared COT. As illustrated in FIG. 3, the method for sharing a COT may include, but not limited to, the following.

At block S301, the total length of the shared COT is determined.

At block S302, a first number of slots and a second number of slots are determined.

At block S303, the first remained length of the COT is determined based on the total length of the shared COT.

In embodiments of the disclosure, the first number of slots may be understood as a number of slots occupied by the first terminal device for data transmission; the second number of slots may be understood as a number of slots occupied by the second terminal device for data transmission; and a number of offset slots may be understood as a number of spaced slots between a slot carrying the first shared COT information and a start slot of the COT.

In one implementation, the determining of the first remained length of the COT based on the total length of the shared COT may be implemented as follows. A processing time for a terminal device is determined, and the first remained length of the COT is determined based on the total length of the shared COT, the number of offset slots and the processing time for the terminal device. The first number of slots is M, the second number of slots is 1, M is a positive integer greater than 1, the number of offset slots is a number of spaced slots between a slot carrying the first shared COT information and a start slot of the COT; and the processing time for the terminal device is a time required for the terminal device to decode sidelink control information (SCI) and prepare a data packet.

In some examples, considering the impact of the processing time for the terminal device on the shared COT, when the first number of slots is M, M is a positive integer greater than 1, and the second number of slots is 1, the first remained length of the COT carried in the first shared COT information carried in each slot may be determined by using a following formula:

$$T_1 = T - K - t \qquad (1)$$

in which, T1 represents the first remained length of the COT, T represents the total length of the COT, K represents the number of offset slots, and t represents the processing time for the terminal device, i.e., the time required for the terminal device to decode the SCI and prepare the data packet. The processing time for the terminal device may be set by the terminal device based on its own situation or may be pre-configured uniformly through the system. The processing time for multiple terminal devices sharing the same COT is the same or the processing time for all terminal devices is the same.

Figure 4:
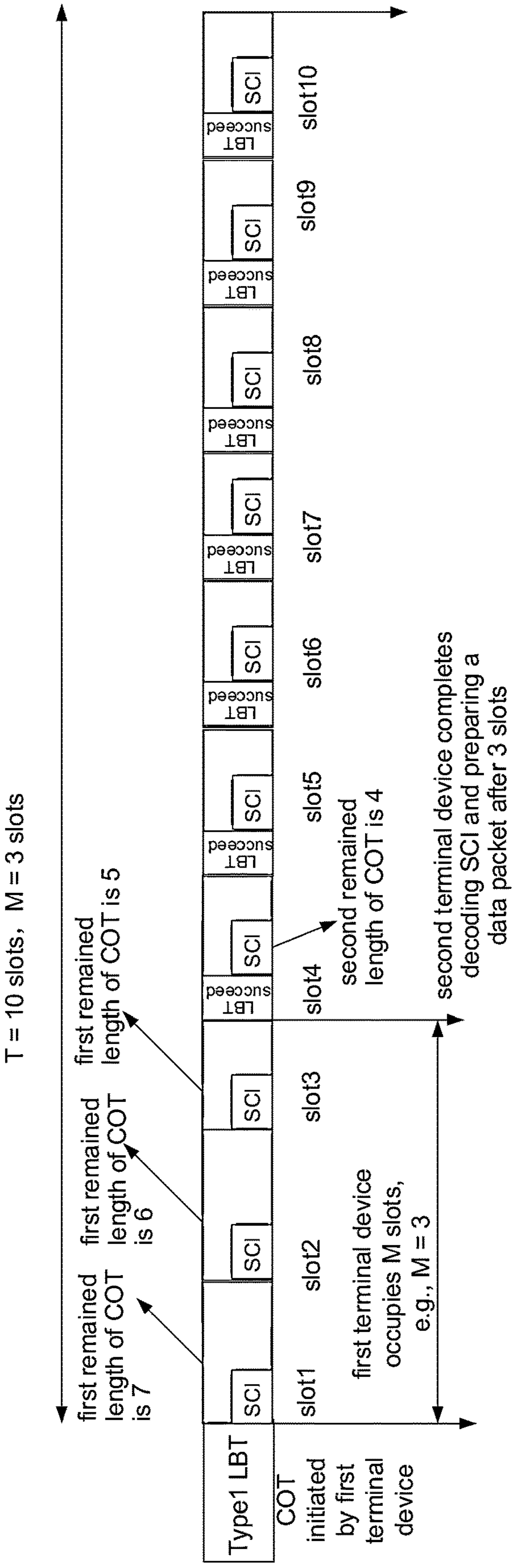
FIG. 4 is a schematic diagram related to a method for sharing a COT according to embodiments of the disclosure.

For example, as illustrated in FIG. 4, FIG. 4 is a schematic diagram related to a method for sharing a COT according to embodiments of the disclosure. In this example, the total length of the shared COT, represented by T, is 10 slots, the first number of slots, represented by M, is equal to the processing time for the terminal device, represented by t, which is for example 3 slots; the start slot of the shared COT is the slot1, and a slot after the slot1 is the slot2 (that is, the number of offset slots, represented by K, between the slot2 relative to the slot1 is 1 slot). Then, the first remained length of the COT contained in the first shared COT information carried in the slot2 is:

$$T_1 = T - K - t = 10 - 1 - 3 = 6.$$

That is, the first remained length of the COT contained in the first shared COT information carried in the slot2 is 6 slots.

In an implementation, the determining of the first remained length of the COT based on the total length of the shared COT may be implemented as follows. The processing time for the terminal device is determined; the first remained length of the COT is determined based on the total length of the shared COT and the first number of slots, in which the first number of slots and the second number of slots are both N, N is a positive integer greater than 1, and the first number of slots is greater than or equal to the processing time for the terminal device.

In some examples, considering the impact of the processing time for the terminal device on the shared COT, the first number of slots and the second number of slots are both N, N is a positive integer greater than 1, and the first number of slots is greater than or equal to the processing time for the terminal device, the respective first remained length of the COT contained in the first shared COT information carried in each slot is the same, which may be determined using a following formula.

$$T_1 = T - N; \quad (2)$$

in which, T1 represents the first remained length of the COT, T represents the total length of the COT, and N represents the first number of slots.

Figure 5:
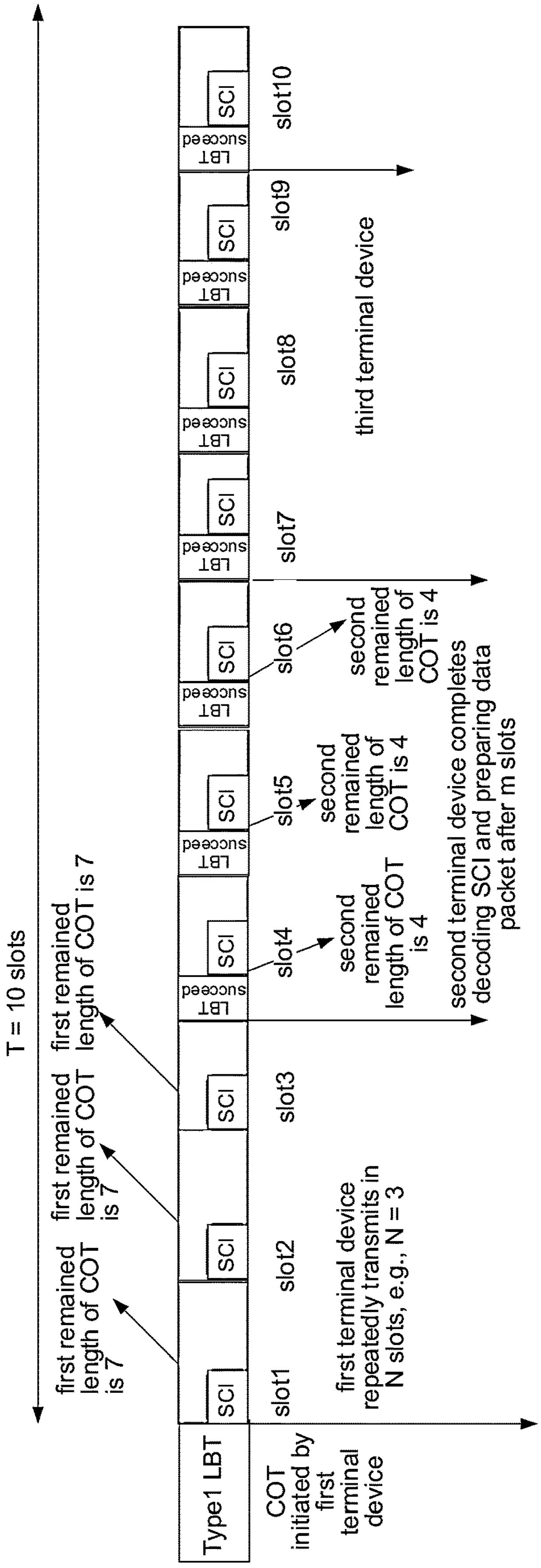
FIG. 5 is a schematic diagram related to another method for sharing a COT according to embodiments of the disclosure.

For example, as illustrated in FIG. 5, FIG. 5 is a schematic diagram related to another method for sharing a COT according to embodiments of the disclosure. In this example, the total length of the shared COT, represented by T, is 10 slots, and the first number of slots and the second number of slots are both 3. Then, respective first remained lengths of the COT contained in the first shared COT information carried in the slot1, slot2 and slot3 are all:

$$T_1 = T - N = 10 - 3 = 7.$$

That is, the first remained lengths of the COT included in the first shared COT information carried by the slot1, slot2, and slot3 are all 7 slots.

In an implementation, the determining of the first remained length of the COT based on the total length of the shared COT may be implemented as follows. The first remained length of the COT is determined based on the total length of the shared COT and the first number of slots; in which, the first number of slots and the second number of slot are both one.

In an example, regardless of the impact of the processing time for the terminal device on the shared COT, when the first number of slots and the second number of slots are both one, the first remained length of the COT is determined through a following formula 3:

$$T_1 = T - 1 \quad (3)$$

in which T1 represents the first remained length of the COT, T represents the total length of the COT, and 1 represents one slot occupied by the first terminal device.

Figure 6:
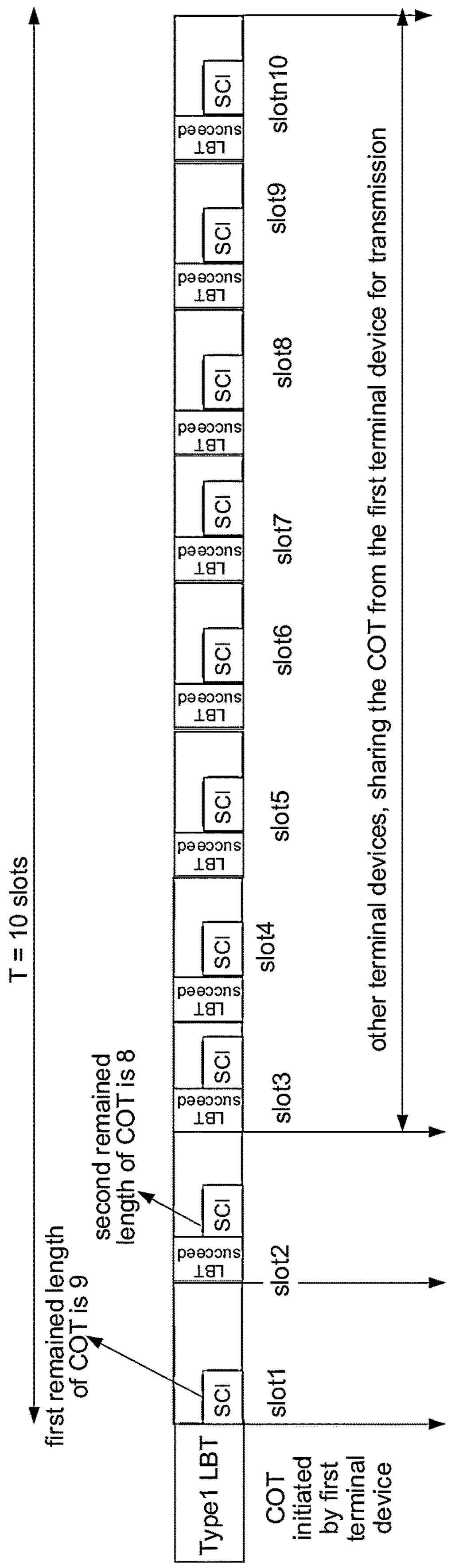
FIG. 6 is a schematic diagram related to still another method for sharing a COT according to embodiments of the disclosure.

For example, as illustrated in FIG. 6, FIG. 6 is a schematic diagram related to still another method for sharing a COT according to embodiments of the disclosure. In this example, assuming that the total length T of the shared COT is 10 slots, then the first remained length of the COT included in the first shared COT information sent by the first terminal device to the second terminal device is:

$$T_1 = T - 1 = 10 - 1 = 9.$$

That is, the first remained length of the COT included in the first shared COT information sent by the first terminal device to the second terminal device is 9 slots.

At block S304, the first shared COT information is sent to the second terminal device.

In an implementation, the first shared COT information may be carried through a sidelink communication, to send the first shared COT information to the second terminal device; or the first shared COT information may be carried through a medium access control (MAC) control element (CE), to send the first shared COT information to the second terminal device.

In some examples, first-stage sidelink control information (SCI) may be sent to the second terminal device through a physical sidelink control channel (PSCCH), in which the first-stage SCI includes the first shared COT information In some examples, a second-stage SCI may be sent to the second terminal device through a physical sidelink shared channel (PSSCH), in which the second-stage SCI includes the first shared COT information. For example, the first shared COT information may be indicated by a demodulation reference signal (DMRS) sequence.

In some examples, the first shared COT information may be sent to the second terminal through a symbol other than the PSCCH.

In some examples, the first shared COT information may be sent to the second terminal device through a symbol other than the PSSCH.

For example, a specific signal (such as a specific sequence) is transmitted in an Automatic Gain Control (AGC) symbol or a Guard Period (GP) symbol to indicate the first shared COT information.

In some examples, the first shared COT information may be indicated implicitly through the PSCCH or PSSCH.

According to embodiments of the disclosure, the first remained length of the COT may be determined based on the total length of the shared COT, the first number of slots, the second number of slots, and the number of offset slots, and may be sent to the second terminal device, such that the second terminal device may share COT, thereby improving a utilization rate of frequency bands and meeting communication service requirements.

Figure 7:
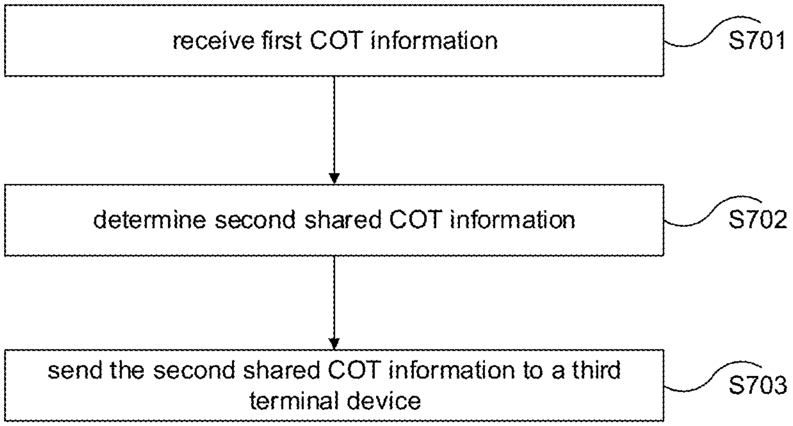
FIG. 7 is a flowchart illustrating still another method for sharing a COT according to embodiments of the disclosure.

As illustrated in FIG. 7, FIG. 7 is a flowchart illustrating still another method for sharing a COT according to embodiments of the disclosure. It is noteworthy that the method for sharing the COT according to embodiments of the disclosure is performed by a second terminal device. As illustrated in FIG. 7, the method for sharing the COT may include, but not limited to, the following.

At block S701, first shared COT information is received.

The first shared COT information is generated and sent by the first terminal device connected to the second terminal device through a sidelink based on different situations.

At block S702, the second shared COT information is determined.

In an implementation, the second shared COT information includes at least one of: a second remained length of the COT; a COT ID; or a channel access type.

The channel access type is configured to indicate a type of accessing a channel used by a third terminal device that receives the second shared COT information, such as Type 2A, Type 2B, or Type 2C.

In an implementation, the first remained length of the COT may be obtained from the first shared COT information, and the second remained length of the COT may be determined based on the first remained length of the COT.

In an implementation, after determining the first remained length of the COT, a second number of slots is determined and the second remained length of the COT is determined based on the first remained length of the COT, in which the second number of slots a number of slots occupied by the second terminal device for data transmission.

In an implementation, the determining of the second remained length of the COT based on the first remained length of the COT may be implemented as follows. The second remained length of the COT is determined based on the first remained length of the COT and a processing time for the terminal device; in which, the second number of slots is 1 and the processing time for the terminal device is a time required for the terminal device to decode SCI and prepare a data packet.

For example, when the second number of slots is 1, corresponding to a situation represented by formula 1, the second remained length of the COT may be determined through the following formula:

$$T_2 = T_1 - t \tag{4}$$

in which, T2 represents the second remained time of the COT, T1 represents the first remained time of the COT, and t represents the processing time for the terminal device.

For example, as illustrated in FIG. 4, FIG. 4 is a schematic diagram related to a method for sharing a COT according to embodiments of the disclosure. As illustrated in FIG. 4, it may be obtained from formula 1 that the first remained length of the COT, represented by $T_1$, in the first shared COT information carried by the slot1 is 7 slots. The second terminal device, in the slot4, obtains the first remained time length of the COT, represented by $T_1$, of the slot1, after the processing time that is 3 slots, and the second remained time length of the COT contained in the second shared COT information carried in the slot4 for the second terminal device is:

$$T_2 = T_1 - t = 7 - 3 = 4.$$

That is, the second remained length of the COT included in the second shared COT information carried in the slot4 for the second terminal device is 4 slots.

The method for determining the first remained length of the COT in embodiments of the disclosure is only an example, which is not limited in embodiments of the disclosure, and will not be repeated here.

In an implementation, the determining of the second remained length of the COT based on the first remained length of the COT may be implemented as follows. The second remained length of the COT is determined based on the first remained length of the COT and the second number of slots; in which the second number of slots is N, and Nis a positive integer greater than 1.

For example, when the second number of slots is N, and N is a positive integer greater than 1, corresponding to a situation represented by formula 2, the second remained length of the COT included in the second shared COT information may be determined by a following formula:

$$T_2 = T_1 - N \tag{5}$$

in which, T2 represents the second remained time of the COT, and N represents the second number of slots.

For example, as illustrated in FIG. 5, FIG. 5 is a schematic diagram related to another method for sharing a COT according to embodiments of the disclosure. As illustrated in FIG. 5, the first number of slots and the second number of slots are both 3 slots, and the first remained time length T1 of the COT obtained from formula 2 is 7 slots. Then the second remained lengths of the COT contained in the second shared COT information carried in the slot4, slot5 and slot6 occupied by the second terminal device are all:

$$T_2 = T_1 - N = 7 - 3 = 4.$$

That is, the second remained lengths of the COT contained in the shared COT information carried in the occupied slot4, slot5 and slot6 for the second terminal device are all 4 slots.

The method for determining the first remained length of the COT in embodiments of the disclosure is only an example, which is not limited in embodiments of the disclosure and will not be repeated here. In an implementation, if the first remained length of the COT obtained by the second terminal device is 0, the sharing of the COT is stopped.

At block S703, the second shared COT information is sent to the third terminal device.

The third terminal device is a terminal device with which the COT is shared and may communicate with the second terminal device through a sidelink mode. The third terminal device may be the same as the first terminal device, that is, the second terminal device may send the second shared COT information back to the first terminal device.

For example, the second terminal device obtains the shared COT information by decoding the SCI and obtains the first remained length of the COT from the shared COT information. When it is determined that the first remained length of the COT is greater than 0, the listen before talk (LBT) is performed through the channel access type indicated in the first shared COT information. After the LBT is successful, data carrying the second shared COT information is sent to the third terminal device. When it is determined that the first remained length of the COT is equal to 0, the sharing of the COT is stopped.

In an implementation, the second shared COT information may be carried through a sidelink communication, to send the second shared COT information to the third terminal device. Or, the second shared COT information may be carried through a MAC CE, to send the second shared COT information to the third terminal device.

In some examples, a first-stage SCI may be sent to the third terminal device through a PSCCH, in which the first-stage SCI includes the second shared COT information.

In some examples, a second-stage SCI may be sent to the third terminal device through a PSSCH, in which the second-stage SCI includes the second shared COT information.

For example, the first shared information may be indicated through a DMRS sequence.

In some examples, the second shared COT information may be sent to the second terminal device through a symbol other than the PSCCH.

In some examples, the second shared COT information may be sent to the second terminal device through a symbol other than the PSSCH.

For example, a specific signal (such as a specific sequence) is transmitted in an AGC symbol or a GP symbol to indicate the second shared information.

In some examples, the second shared COT information may be indicated implicitly through the PSCCH or PSSCH.

In embodiments of the disclosure, the methods according to embodiments of the disclosure are introduced from the perspectives of the first terminal device and the second terminal device respectively. To realize various functions in the methods according to above-mentioned embodiments of the disclosure, the first terminal device and the second terminal device may include a hardware structure and a software module, and implement the above various functions in the form of a hardware structure, a software module, or both the hardware structure and the software module. A certain function among the above-mentioned functions may be implemented in the form of a hardware structure, a software module, or both the hardware structure and the software module.

Figure 8:
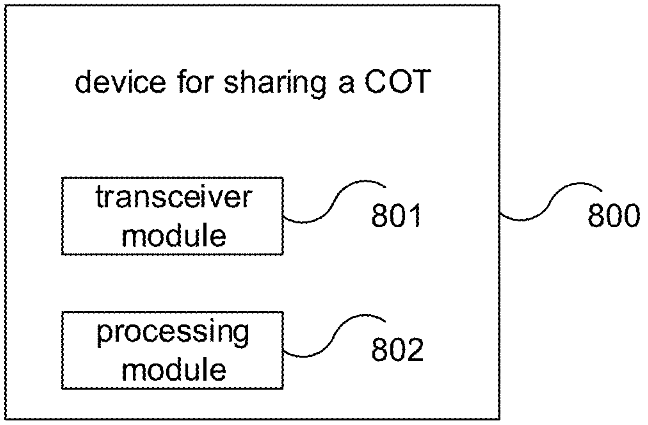
FIG. 8 is a block diagram illustrating a device for sharing a COT according to embodiments of the disclosure.

As illustrated in FIG. 8, FIG. 8 is a block diagram illustrating a device 800 for sharing a COT according to embodiments of the disclosure. It is noteworthy that the device 800 for sharing a COT may be the first terminal device, a device included in the first terminal device, or a device that may be matched and used with the first terminal device.

The device 800 for sharing a COT illustrated in FIG. 8 includes a transceiver module 801.

In embodiments of the disclosure, the transceiver module 801 is configured to send first shared COT information to a second terminal device, in which the second terminal device is a terminal device with which the COT is shared.

In an implementation, the first shared COT information sent by the transceiver module 801 to the second terminal device includes at least one of: a first remained length of the COT; a COT ID; or a channel access type.

In an implementation, the device 800 for sharing a COT further includes a processing module 802.

In embodiments of the disclosure, the processing module 802 is configured to determine a total length of a shared COT; determine a first number of slots and a second number of slots; determine the first remained length of the COT based on the total length of the shared COT; in which the first number of slots is a number of slots occupied by the first terminal device for data transmission and the second number of slots is a number of slots occupied by the second terminal device for data transmission.

In an implementation, the processing module 802 is configured to: determine a processing time for the terminal device, in which the processing time for the terminal device is a time required for the terminal device to decode sidelink control information (SCI) and prepare a data packet; and determine the first remained length of the COT based on the total length of the shared COT, a number of offset slots and the processing time for the terminal device, in which the first number of slots is M, M is a positive integer greater than 1, the second number of slots is 1, and the number of offset slots is a number of spaced slots between a slot carrying the first shared COT information and a start slot of the COT.

In an implementation, the processing module 802 is configured to: determine the processing time for the terminal device; determine the first remained length of the COT based on the total length of the shared COT and the first number of slots, in which the first number of slots and the second number of slots are both N, N is a positive integer greater than 1, the first number of slots is greater than or equal to the processing time for the terminal device, and the processing time for the terminal device is a time required for the terminal device to decode a SCI and prepare a data packet.

In an implementation, the processing module 802 is configured to: determine the first remained length of the COT based on the total length of the shared COT and the first number of slots; in which the first number of slots and the second number of slots are both 1.

In an implementation, the transceiver module 801 is configured to: send first-stage SCI to the second terminal device through a PSCCH, in which the first-stage SCI includes the first shared COT information; send second-stage SCI to the second terminal device through a PSSCH, in which the second-stage SCI includes the first shared COT information; send the first shared COT information to the second terminal device through a symbol other than the PSCCH; send the first shared COT information to the second terminal device through a symbol other than the PSSCH; or send the first shared COT information to the second terminal device through a MAC CE.

Figure 9:
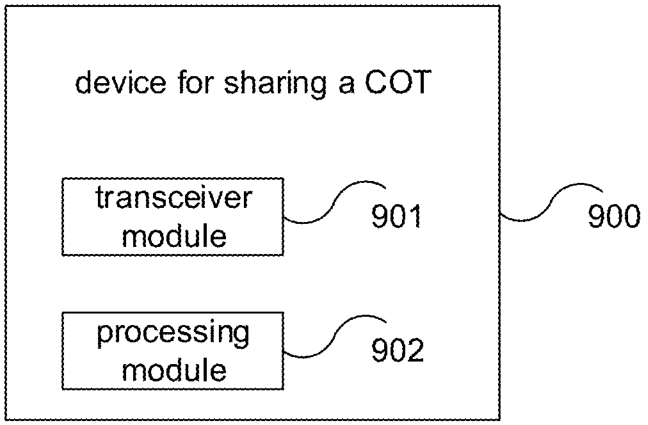
FIG. 9 is a block diagram illustrating another device for sharing a COT according to embodiments of the disclosure.

As illustrated in FIG. 9, FIG. 9 is a block diagram illustrating a device 900 for sharing a COT according to embodiments of the disclosure. It is noteworthy that the device 900 for sharing a COT may be the second terminal device, a device included in the second terminal device, or a device that may be matched and used with the second terminal device.

The device 900 for sharing a COT illustrated in FIG. 9 includes a transceiver module 901 and a processing module 902.

In embodiments of the disclosure, the transceiver module 901 is configured to receive first shared COT information; and send second shared COT information to a third terminal device; in which the third terminal device is another terminal device with which the COT is shared. The processing module 902 is configured to determine the second shared COT information.

In an implementation, the second shared COT information sent by the transceiver module 901 to the third terminal device includes at least one of: a second remained length of the COT; a COT ID; or a channel access type.

In an implementation, the processing module 902 is configured to determine the first remained length of the COT; determine a second number of slots; and determine the second remained length of the COT based on the first remained length of the COT.

In an implementation, the processing module 902 is configured to: determine the second remained length of the COT based on the first remained length of the COT and the processing time for the terminal device; in which the second number of slots is 1, and the processing time for the terminal device is a time required for the terminal device to decode SCI and prepare a data packet.

In an implementation, the processing module 902 is configured to: determine the second remained length of the COT based on the first remained length of the COT and the second number of slots, in which the second number of slots is N, and N is a positive integer greater than 1.

In an implementation, the transceiver module 901 is configured to: send first-stage SCI to the third terminal device through a PSCCH, in which the first-stage SCI includes the second shared COT information; send second-stage SCI to the third terminal device through a PSSCH, in which the second-stage SCI includes the second shared COT information; send the second shared COT information to the third terminal device through a symbol other than the PSCCH; send the second shared COT information to the third terminal device through a symbol other than the PSSCH; or send the second shared COT information to the third terminal device through a MAC CE.

Figure 10:
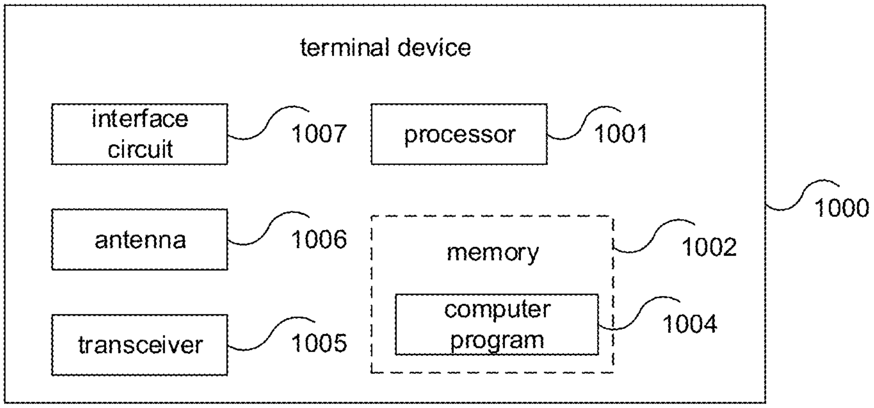
FIG. 10 is a block diagram illustrating a terminal device according to embodiments of the disclosure.

As illustrated in FIG. 10, FIG. 10 is a block diagram illustrating a terminal device 1000 according to embodiments of the disclosure. The terminal device 1000 may be the first terminal device or the second terminal device or may be a chip, a chip system or a processor that supports the terminal device to implement the foregoing methods. The terminal device may be used to implement the methods described in foregoing method embodiments, and for details, refer to the descriptions in foregoing method embodiments.

The terminal device 1000 may include one or more processors 1001. The processor 1001 may be a general purpose processor, a special purpose processor or the like. For example, the processor may be a baseband processor or a central processing unit. The baseband processor may be used to process communication protocols and communication data, and the central processing unit may be used to control communication devices (such as base stations, baseband chips, terminal equipment, terminal equipment chips, DU or CU, etc.), execute computer programs, process data of computer programs.

In some examples, the terminal device 1000 may further include one or more memories 1002, on which a computer program 1004 may be stored. The processor 1001 may execute the computer program 1004 to cause the terminal device 1000 to perform the methods described in foregoing method embodiments. In some examples, the memory 1002 may also have data stored thereon. The terminal device 1000 and the memories 1002 may be set separately or integrated together.

In some examples, the terminal device 1000 may further include a transceiver 1005 and an antenna 1006. The transceiver 1005 may be called a transceiver unit, a transceiver module, or a transceiver circuit, and is configured to implement a transceiver function. The transceiver 1005 may include a receiver and a transmitter. The receiver may be called a receiver unit or a receiving circuit for realizing a receiving function, and the transmitter may be called a transmitter unit or a sending circuit for realizing a sending function.

In some examples, the terminal device 1000 may further include one or more interface circuits 1007. The interface circuit 1007 is configured to receive code instructions and transmit the code instructions to the processor 1001. The processor 1001 runs the code instructions to enable the terminal device 1000 to execute the methods described in foregoing method embodiments.

When the terminal device 1000 is the first terminal device in foregoing method embodiments, the transceiver 1005 is configured to execute the block S201 in FIG. 2 and the block S303 in FIG. 3; and the processor 1001 is configured to execute the block S301 and the block S302 in FIG. 3.

When the terminal device 1000 is the second terminal device in foregoing method embodiments, the processor 1001 is configured to execute the block S702 in FIG. 7, and the transceiver 1005 is configured to execute the block S701 and the block S703 in FIG. 7.

In an implementation, the processor 1001 may include a transceiver for implementing receiving and sending functions. For example, the transceiver may be a transceiver circuit, an interface, or an interface circuit. The transceiver circuits, interfaces or interface circuits for realizing the functions of receiving and sending may be separated or integrated together. The above-mentioned transceiver circuit, interface or interface circuit may be used for reading and writing code/data, or the above-mentioned transceiver circuit, interface or interface circuit may be used for signal transmission or transfer.

In an implementation, the processor 1001 may store a computer program 1003, and the computer program 1003 runs on the processor 1001 to enable the terminal device 1000 to execute the methods described in foregoing method embodiments. The computer program 1003 may be solidified in the processor 1001, and in this case, the processor 1001 may be implemented by hardware.

In an implementation, the terminal device 1000 may include a circuit, and the circuit may implement the function of sending or receiving or communicating in foregoing method embodiments. The processors and transceivers described in this disclosure may be implemented on integrated circuits (ICs), analog ICs, radio frequency integrated circuits (RFICs), mixed-signal ICs, application specific integrated circuits (ASICs), printed circuit boards (PCBs), electronic equipment, or the like. The processor and transceiver may also be fabricated using various IC process technologies such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), or the like.

The terminal device described in above embodiments may be a network device or a terminal device, but the scope of the terminal device described in this disclosure is not limited thereto, and the structure of the terminal device may not be limited by FIG. 10. The terminal device may be a stand-alone device or may be part of a larger device. For example, the terminal device may be:

(1) Stand-alone integrated circuits ICs, or chips, or chip systems or subsystems;

(2) A set of one or more ICs, in some examples, the set of ICs may also include storage components for storing data and computer programs;

(3) ASIC, such as modem (Modem);

(4) Modules that may be embedded in other devices;

(5) Receivers, terminal devices, intelligent terminal devices, cellular phones, wireless devices, handsets, mobile units, vehicle devices, network devices, cloud devices, artificial intelligence devices, etc.;

(6) Others and so on.

Those skilled in the art may also understand that various illustrative logical blocks and steps listed in embodiments of the disclosure may be implemented by electronic hardware, computer software, or a combination of both. Whether such functions are implemented by hardware or software depends on the specific application and overall system design requirements. Those skilled in the art may use various methods to implement the described functions for each specific application, but such implementation should not be understood as exceeding the protection scope of embodiments of the disclosure.

Embodiments of the disclosure also provide a system for sharing a COT. The system includes the device for sharing a COT as the first terminal device in foregoing method embodiments in aforementioned embodiments in FIG. 2 and FIG. 3 and the device for sharing a COT as the second terminal device in foregoing method methods in aforementioned embodiments in FIG. 7

The disclosure also provides a readable storage medium on which instructions are stored, and when the instructions are executed by a computer, the functions of any one of above method embodiments are realized.

The disclosure also provides a computer program product, which implements the functions of any one of above method embodiments when the computer program product is executed by a computer.

In above embodiments, all or part of them may be implemented by software, hardware, firmware or any combination thereof. When implemented using software, it may be implemented in whole or in part in the form of a computer program product. The computer program product includes one or more computer programs. When the computer program is loaded and executed on the computer, all or part of the processes or functions according to embodiments of the disclosure will be generated. The computer can be a general purpose computer, a special purpose computer, a computer network, or other programmable devices. The computer program may be stored in or transmitted from one computer-readable storage medium to another computer-readable storage medium. For example, the computer program may be downloaded from a website, a computer, a server or a data center to another website site, computer, server or data center in a wired manner (such as coaxial cable, optical fiber, digital subscriber line (DSL)) or a wireless manner (such as infrared, wireless, microwave, etc.). The computer-readable storage medium may be any available medium that may be accessed by a computer, or a data storage device such as a server or a data center integrated with one or more available media. The available medium may be a magnetic medium (such as, a floppy disk, a hard disk, a magnetic tape), an optical medium (such as, a high-density digital video disc (digital video disc, DVD)), or a semiconductor medium (such as, a solid state disk (solid state disk, SSD)) etc.

With the methods and devices for sharing a COT, by carrying shared COT information during the sidelink communication, the shared COT of unlicensed frequency bands is realized, thereby improving the utilization rate of frequency bands and meet communication service requirements.

Those of ordinary skill in the art may understand that the first, second, and other numbers involved in the disclosure are only for convenience of description, are not used to limit the scope of embodiments of the disclosure, and also indicate an order or a sequence.

The term “at least one” in the disclosure may also be described as one or more, and the term “a plurality of” may be two, three, four or more, which is not limited in the disclosure. In embodiments of the disclosure, for a technical feature, the technical feature is distinguished by “first”, “second”, “third”, “A”, “B”, “C” and “D”, etc. The technical features described in the “first”, “second”, “third”, “A”, “B”, “C” and “D” have no sequence or order of magnitude among the technical features described.

The correspondence shown in each table in the disclosure may be configured or predefined. The values of the information in each table are just examples, and may be configured as other values, which are not limited in the disclosure. When configuring the correspondence between the information and each parameter, it is not necessarily required to configure all the correspondences shown in the tables. For example, in the table in the disclosure, the correspondences shown in some rows may not be configured. As another example, appropriate deformation adjustments may be made based on the above table, such as splitting, merging, and so on. The names of the parameters shown in the titles of the above tables may also adopt other names understandable by the communication device, and the values or representations of the parameters may also be other values or representations understandable by the communication device. In realizing the above tables, other data structures may also be used, such as arrays, queues, containers, stacks, linear tables, pointers, linked lists, trees, graphs, structures, classes, heaps, hash tables or others.

Predefinition in the disclosure may be understood as definition, definition in advance, storage, pre-storage, pre-negotiation, pre-configuration, curing, or pre-firing.

Those skilled in the art may appreciate that the units and algorithm steps of the examples described in conjunction with embodiments disclosed herein may be implemented by electronic hardware, or a combination of computer software and electronic hardware. Whether these functions are executed by hardware or software depends on the specific application and design constraints of the technical solution. Skilled person may implement the described functionality using different methods for each particular application, but such implementation should not be considered beyond the scope of the disclosure.

Those skilled in the art may clearly understand that for the convenience and brevity of the description, the specific working process of the above-described system, device and unit may refer to the corresponding process in foregoing method embodiments, which will not be repeated here.

The above is only a specific implementation of the disclosure, but the scope of protection of the disclosure is not limited thereto. Any skilled in the art may easily think of changes or substitutions within the technical scope of the disclosure, which should fall within the protection scope of the disclosure. Therefore, the protection scope of the disclosure should be determined by the protection scope of the claims.

What is claimed is:

1. A method for sharing a channel occupancy time (COT), applied to a sidelink unlicensed frequency band and performed by a first terminal device, wherein the method comprises:

sending first shared COT information to a second terminal device, wherein the first shared COT information comprises a first remained length of a first shared COT;

determining a total length of the first shared COT;

determining a first number of slots and a second number of time slots, wherein the first number of slots is M slots occupied by the first terminal device for data transmission, in which M is a positive integer greater than 1, and the second number of slots is a number of slots occupied by the second terminal device for data transmission, in which the second number of slots is 1; and determining a processing time for a terminal device, wherein the processing time of the terminal device is a time required for the terminal device to decode sidelink control information (SCI) and prepare a data packet; and determining the first remained length of the first shared COT based on the total length of the first shared COT, a number of offset slots, and the processing time for the terminal device, wherein the number of offset slots is a number of spaced slots between a slot carrying the first shared COT information and a start slot of the first shared COT.

2. The method of claim 1, wherein the first shared COT information further comprises at least one of:

a COT identifier (ID); or a channel access type.

3. The method of claim 1, wherein determining the first remained length of the first shared COT based on the total length of the first shared COT comprises:

determining a processing time for a terminal device; and determining the first remained length of the first shared COT based on the total length of the first shared COT and the first number of slots;

wherein the first number of slots and the second number of slots are both N, N is a positive integer greater than 1, and the first number of slots is greater than or equal to the processing time for the terminal device.

4. The method of claim 1, wherein determining the first remained length of the first shared COT based on the total length of the first shared COT comprises:

determining the first remained length of the first shared COT based on the total length of the first shared COT and the first number of slots;

wherein the first number of slots and the second number of slots are both one.

5. The method of claim 1, wherein sending the first shared COT information to the second terminal device comprises one of:

sending first-stage sidelink control information (SCI) to the second terminal device through a physical sidelink control channel (PSCCH), wherein the first-stage SCI comprises the first shared COT information;

sending second-stage SCI to the second terminal device through a physical sidelink shared channel (PSSCH), wherein the second-stage SCI comprises the first shared COT information;

sending the first shared COT information to the second terminal device through a symbol other than the PSCCH;

sending the first shared COT information to the second terminal device through a symbol other than the PSSCH; or sending the first shared COT information to the second terminal device through a medium access control (MAC) control element (CE).

6. A non-transitory computer-readable storage medium, having instructions stored thereon, wherein when executed, the instructions cause a processor to perform the method of claim 1.

7. A method for sharing a channel occupancy time (COT), applied to a sidelink unlicensed frequency band and performed by a second terminal device, wherein the method comprises:

receiving first shared COT information from a first terminal device, wherein the first shared COT information comprises a first remained length of a first shared COT;

determining the first remained length of the first shared COT;

determining a second number of slots, wherein the second number of slots is a number of slots occupied by the second terminal device for data transmission, in which the second number of slots is 1;

determining a second remained length of a second shared COT comprised in second shared COT information based on the first remained length of the first shared COT and a processing time for a terminal device, wherein the processing time of the terminal device is a time required for the terminal device to decode sidelink control information (SCI) and prepare a data packet; and sending the second shared COT information to a third terminal device;

wherein the first remained length of the first shared COT is determined by the first terminal device based on the total length of the first shared COT, a number of offset slots, and the processing time for the terminal device, wherein the number of offset slots is a number of spaced slots between a slot carrying the first shared COT information and a start slot of the first shared COT.

8. The method of claim 7, wherein the second shared COT information further comprises at least one of:

a COT identifier (ID); or a channel access type.

9. The method of claim 7, wherein determining the second remained length of the second shared COT comprises:

determining the second remained length of the second shared COT based on the first remained length of the first shared COT and the second number of slots;

wherein the second number of slots is N and N is a positive integer greater than 1.

10. The method of claim 7, wherein sending the second shared COT information to the third terminal device comprises one of:

sending first-stage sidelink control information (SCI) to the third terminal device through a physical sidelink control channel (PSCCH), wherein the first-stage SCI comprises the second shared COT information;

sending second-stage SCI to the third terminal device through a physical sidelink shared channel (PSSCH), wherein the second-stage SCI comprises the second shared COT information;

sending the second shared COT information to the third terminal device through a symbol other than the PSCCH;

sending the second shared COT information to the third terminal device through a symbol other than the PSSCH; or sending the second shared COT information to the third terminal device through a medium access control (MAC) control element (CE).

11. A second terminal device, comprising a processor and a memory, wherein the memory has a computer program stored thereon, and the processor is configured to perform the method of claim 7.

12. A non-transitory computer-readable storage medium, having instructions stored thereon, wherein when executed, the instructions cause a processor to perform the method of claim 7.

13. A first terminal device, comprising a processor and a memory, wherein the memory has a computer program stored thereon, and the processor is configured to:

send first shared channel occupancy time (COT) information to a second terminal device, wherein the first shared COT information comprises a first remained length of a first shared COT;

determine a total length of the first shared COT;

determine a first number of slots and a second number of time slots, wherein the first number of slots is M slots occupied by the first terminal device for data transmission, in which M is a positive integer greater than 1, and the second number of slots is a number of slots occupied by the second terminal device for data transmission, in which the second number of slots is 1; and determine a processing time for a terminal device, wherein the processing time of the terminal device is a time required for the terminal device to decode sidelink control information (SCI) and prepare a data packet; and determine the first remained length of the first shared COT based on the total length of the first shared COT, a number of offset slots, and the processing time for the terminal device, wherein the number of offset slots is a number of spaced slots between a slot carrying the first shared COT information and a start slot of the first shared COT.

14. The terminal device of claim 13, wherein the first shared COT information further comprises at least one of:

a COT identifier (ID); or a channel access type.

* * * * *